(12) United States Patent
Nagura et al.

(10) Patent No.: US 6,922,989 B2
(45) Date of Patent: Aug. 2, 2005

(54) PLURAL PRESSURE OIL ENERGIES SELECTIVE RECOVERY APPARATUS AND SELECTIVE RECOVERY METHOD THEREFOR

(75) Inventors: Shinobu Nagura, Oyama (JP); Kazuhiro Maruta, Kawaguchi (JP); Nobumi Yoshida, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/613,067

(22) Filed: Jul. 7, 2003

(65) Prior Publication Data
US 2004/0035103 A1 Feb. 26, 2004

(30) Foreign Application Priority Data
Jul. 8, 2002 (JP) ........................................ 2002-198958

(51) Int. Cl.[7] .................................................. F15B 9/10
(52) U.S. Cl. ........................................................ 60/414
(58) Field of Search ........................... 60/414, 484, 413

(56) References Cited

U.S. PATENT DOCUMENTS 6,151,894 A * 11/2000 Endo et al. .................... 60/414
6,378,301 B2 * 4/2002 Endo et al. .................... 60/414
6,460,332 B1 * 10/2002 Maruta et al. ................. 60/414

FOREIGN PATENT DOCUMENTS

JP 10-184615 7/1998

* cited by examiner

Primary Examiner—Thomas E. Lazo
(74) Attorney, Agent, or Firm—Varndell & Varndell, PLLC

(57) ABSTRACT

It is an object of the present invention to provide a plural pressure oil energies selective recovery apparatus which can selectively recover pressure oil energies stored in plural pressure oil actuators, based upon recovery conditions. A priority for recovering a return pressure oil from a hydraulic actuator is set in advance for an operation lever of each of the plural hydraulic actuators. If the operation lever is in the non-actuation state at a preceding detection point, the plural pressure oil energies selective recovery apparatus recovers a return pressure oil from a corresponding hydraulic actuator. If the operation lever is in the actuation state, the plural pressure oil energies selective recovery apparatus does not recover a pressure oil.

5 Claims, 7 Drawing Sheets

PLURAL PRESSURE OIL ENERGIES SELECTIVE RECOVERY APPARATUS AND SELECTIVE RECOVERY METHOD THEREFOR

BACKGROUND OF THE INVENTION

1. Field of the Invention

The present invention relates to a plural pressure oil energies selective recovery apparatus which can selectively recover energy stored in each of plural hydraulic actuators based upon recovery conditions for preferentially recovering the energy.

2. Description of the Related Art

In general, a return pressure oil from a hydraulic actuator is directly returned to a tank. Since an energy of the return pressure oil is converted into a thermal energy via a throttle valve or the like provided in a return circuit to the tank and directly discharged to the outside, the energy of the return pressure oil has never been reutilized. Consequently, it has been attempted to recover and reutilize the energy of the return pressure oil of the hydraulic actuator. As a recovery apparatus for this purpose, for example, JP-A-10-184615 filed by the applicant of this application proposes a return pressure oil recovery apparatus.

In the pressure oil recovery apparatus, a return pressure oil is selected out of return pressure oils from plural hydraulic actuators according to an instruction from an operation instructor, and an energy of the selected return pressure oil is recovered and reutilized. As shown in FIG. 7, this return pressure oil recovery apparatus, by a selection circuit 54 controlled by an external operation instruction, selectively controls communication of one or two sub-recovery circuits among sub-recovery circuits 53a to 53d, which pass return pressure oils from plural hydraulic actuators 50 to 52, with a main recovery circuit 55 connected to a first hydraulic pump motor 56 serving as a recovery unit and supplies pressure oils passing through the sub-recovery circuits communicating with the main recovery circuit 55 to a first hydraulic pump motor 56, thereby causing the first hydraulic pump motor 56 to perform motor actions. A second hydraulic pump motor 57 mechanically communicating with the first hydraulic pump motor 56 performs a pump action by the driving of the first hydraulic pump motor 56, and a high pressure oil discharged from the second hydraulic pressure pump motor 57 is stored in an accumulator 58.

Next, the return pressure oil recovery apparatus supplies the high pressure oil stored in the accumulator 58 to the second hydraulic pump motor 57, thereby causing the second hydraulic pump motor 57 to perform the motor action, and the first hydraulic pump motor 56 performs the pump action by the driving of the second hydraulic pump motor 57. The pressure oil discharged from the first hydraulic pump motor 56 merges with a pressure oil from a hydraulic pump 60 via a check valve 59 and reutilized.

In the above-mentioned return pressure oil recovery apparatus, recovery work of a pressure oil is performed by selecting a return pressure oil out of return pressure oils from the plural hydraulic actuators with the selection circuit and supplying a pressure oil from a desired hydraulic actuator to the first hydraulic pump motor 56 serving as a recovery unit. Moreover, the recovery work is performed in accordance with a priority determined in advance which defines a return pressure oil from a hydraulic actuator of which work machine is to be recovered preferentially. Selective control of communication between the sub-recovery circuits 53a to 53d and the main recovery circuit 55 is performed in accordance with the priority by an instruction from an operation instructor, and a hydraulic actuator from which a return pressure oil is to be recovered can be determined. Consequently, since the hydraulic actuator from which are turn pressure oil is to be recovered can be selected in accordance with the priority decided in advance in response to the operation instruction, control becomes easy and a recovery efficiency can be increased. Thus, a recovery efficiency as a whole in every work can be increased.

However, in the above-mentioned return pressure oil recovery apparatus, the priority determined in advance is simply set such that the recovery efficiency of a return pressure oil is increased, and a specific method of determining a priority is not specifically disclosed.

SUMMARY OF THE INVENTION

It is an object of the present invention to provide a plural pressure oil energies selective recovery apparatus and a selective recovery method therefor which are adapted to be able to recover a return pressure oil by presenting specific selective recovery conditions for selectively recovering pressure oils from plural hydraulic actuators, and without causing a switching shock and a speed change in a hydraulic pump motor or the like serving as a recovery unit, which occur in the case in which recovery of a pressure oil is switched to another hydraulic actuator while a pressure oil is being recovered form one hydraulic actuator or without causing a situation in which a recovery efficiency decreases even temporarily at the time of specific work for the purpose of increasing a recovery efficiency as a whole, or by selectively choosing a hydraulic actuator with a high recovery efficiency.

The object of the present invention can be attained by respective inventions according to first to fifth aspects of the present invention.

That is, a plural pressure oil energies selective recovery apparatus according to a first aspect of the present invention is a plural pressure oil energies selective recovery apparatus which includes: plural sub-recovery circuits into which return pressure oils from plural hydraulic actuators flow, respectively; a main recovery circuit connected to a return pressure oil recovery unit; and a selection unit which controls the main recovery circuit and the one or more sub-recovery circuits to be connected selectively, in which the selection unit is a selection circuit which controls the sub-recovery circuits and the main recovery circuit to be connected selectively based upon conditions for prioritizing operability of the hydraulic actuator or conditions for prioritizing a return pressure oil with a high recovery efficiency out of the plural recovery pressure oils.

In this plural pressure oil energies selective recovery apparatus, as a selection unit for selecting one or more return pressure oils out of return pressure oils from plural hydraulic actuators and supplying the selected return pressure oils to a pressure oil recovery unit, a selection circuit is used, in which a selected route is controlled based upon the conditions for prioritizing operability of the hydraulic actuators or the conditions for prioritizing a return pressure oil with a high recovery efficiency out of the plural return oils.

Consequently, since the selective communication control of the sub-recovery circuits and the main recovery circuit in the selection unit can be performed under the conditions for prioritizing operability of the hydraulic actuators or the conditions for prioritizing a return pressure oil with a high recovery efficiency out of the plural return pressure oils, return pressure oils from the hydraulic actuators can be recovered efficiently without spoiling operability of a work machine.

Moreover, in the case in which operability of the hydraulic actuators is prioritized as conditions for prioritization, for example, recovery of a return pressure oil is prevented from being switched to recovery of a return pressure oil from another hydraulic actuator while a return pressure oil from one hydraulic actuator is being recovered, and an operation of the hydraulic actuators can always be performed smoothly. In addition, in the case in which a return pressure oil with a high recovery efficiency is prioritized out of plural return pressure oils as conditions for prioritization, return pressure oils can be recovered from a return pressure oil with a high pressure or a large flow amount in order. Moreover, in the case in which a recovery efficiency is increased for work as a whole, even if a state in which a recovery efficiency declines exists in a specific work process, the state can be avoided.

As the operation instruction for controlling the selection circuit, an instruction can be issued to the selection circuit by detecting with a controller a displacement amount of an operation lever for operating hydraulic actuators or a displacement amount of spools slid by the operation lever, or by using a pilot pressure or the like outputted by the operation lever.

As the selection circuit, a switching valve, a check valve, or the like controlled by an external instruction can be used. In addition, as the return pressure oil recovering unit, a hydraulic motor, a hydraulic pump motor, or the like driven by a return pressure oil can be used. Note that the energy of the return pressure oil recovered by the return pressure oil recovery unit is regenerated by a regenerating unit, and the regenerated energy can be accumulated in an accumulator, charged in a capacitor via a generator, used as an auxiliary driving force of another drive source, or reutilized by merging it with a discharged pressure oil from a main hydraulic pump.

A plural pressure oil energies selective recovery apparatus according to a second aspect of the present invention is plural pressure oil energies selective recovery apparatus in which, in addition to the elements of the first aspect of the present invention, the selection circuit is a selection circuit which controls the sub-recovery circuit connecting to a hydraulic actuator operated earlier and the main recovery circuit to be connected selectively.

In this aspect of the present invention, since a return pressure oil from the hydraulic actuator operated earlier is recovered preferentially, even if a return pressure oil flows out from another hydraulic actuator with high energy of a return pressure oil during recovery, the return pressure oil from another hydraulic actuator is not recovered until the return pressure oil from the hydraulic actuator being recovered earlier is completed. Moreover, even after the return pressure oil from the hydraulic actuator being recovered earlier is completed, recovery of the return pressure oil from other hydraulic actuator which is being discharged is not performed, and a return pressure oil from a hydraulic actuator started to be discharged is recovered anew.

Consequently, a destination of recovery of a pressure oil is not changed to other destination of recovery during an operation of a work machine, switching or the like of a destination of recovery among hydraulic actuators with different control characteristics is prevented, shock following the switching, a change in speed in a recovery unit, or a change in operation speed of an hydraulic actuator is not caused, and operability of the hydraulic actuator can be always maintained in the same state.

A plural pressure oil energies selective recovery apparatus according to a third aspect of the present invention is a plural pressure oil energies selective recovery apparatus in which, in addition to the elements of the first aspect of the present invention, the selection circuit is a selection circuit which controls the sub-recovery circuit connecting to a hydraulic actuator, which is selected according to contents of work and the main recovery circuit to be connected selectively.

In this aspect of the present invention, a priority of a hydraulic actuator with a highest recovery effect, from which a return pressure oil should be recovered, is determined according to contents of work of a work machine, a hydraulic actuator is selected based upon the priority, and a return pressure oil from the selected hydraulic actuator is recovered. Consequently, it can be avoided in advance to recover a return pressure oil an actuator with a low recovery efficiency during a work process of the work machine, and output energy of a recovery unit can be prevented from excessively decreasing during recovery of a return pressure oil.

A method of determining a priority can be realized by setting a priority of a hydraulic actuator with a low recovery efficiency to be low in advance such that a return pressure oil from the hydraulic actuator with a low recovery efficiency is not recovered.

Moreover, recovery of a return pressure oil from the hydraulic actuator with a low recovery efficiency can be stopped. When the recovery of the return pressure oil from the hydraulic actuator with a low recovery efficiency is stopped, a return pressure oil from another hydraulic actuator can be recovered instead.

A plural pressure oil energies selective recovery apparatus according to a fourth aspect of the present invention is a plural pressure oil energies selective recovery apparatus in which, in addition to the elements of the first aspect of the present invention, the selection circuit is a selection circuit which controls the sub-recovery circuit connecting to a hydraulic actuator with a high recovery efficiency and the main recovery circuit to be connected selectively.

In this aspect of the present invention, selection of a hydraulic actuator with a high recovery efficiency can be realized by selecting a hydraulic actuator with a highest power caused by a return pressure oil preferentially, selecting a hydraulic actuator which flows out a pressure oil with a highest pressure of a return pressure oil preferentially, or selecting a hydraulic actuator with a largest flow amount of a return pressure oil preferentially.

A power caused by a return pressure oil can be calculated from a detection value of a pressure sensor provided in a cylinder port of each hydraulic actuator and an estimated value of a supply flow amount to a hydraulic actuator corresponding to an operation amount of an operation lever. In addition, a pressure of a return pressure oil can be detected by providing a pressure sensor in an output port from a hydraulic actuator. A flow amount of a return pressure oil can be detected by providing a flow amount sensor in a sub-recovery circuit from a hydraulic actuator.

A fifth aspect of the present invention is a plural pressure oil energies selective recovery method which controls plural sub-recovery circuits into which return pressure oils from plural hydraulic actuators flow, respectively, and a main recovery circuit connected to a return pressure oil recovery apparatus to be connected selectively, in which the connection control is performed based upon conditions for prioritizing operability of the hydraulic actuators or conditions for prioritizing a recovery efficiency of the return pressure oil.

In this aspect of the present invention, return pressure oils from the plural hydraulic actuators is selected to be recovered based upon the conditions prioritizing the operability of the hydraulic actuators or conditions for prioritizing a return pressure oil with a high recovery efficiency out of the plural return pressure oils.

Consequently, since the sub-recovery circuits and the main recovery circuit can be controlled to be connected under the conditions for prioritizing operability of hydraulic actuators or the conditions for prioritizing a return pressure oil with a high recovery efficiency out of the plural recovery pressure oil, a recovery method of efficiently recovering a return pressure oil from a hydraulic actuator without spoiling operability of a work machine can be provided.

Moreover, in the case in which operability of hydraulic actuators is prioritized as conditions for prioritization, for example, recovery of a return pressure oil is prevented from being switched to recovery of a return pressure oil from another hydraulic actuator while a return pressure oil from one hydraulic actuator is being recovered, and an operation of the hydraulic actuators never fluctuates suddenly during the operation and can be always performed smoothly. In addition, in the case in which a return pressure oil with a high recovery efficiency is prioritized out of plural return pressure oils as conditions for prioritization, return pressure oils can be recovered from a return pressure oil with a high pressure or a large flow amount in order. Moreover, in the case in which a recovery efficiency is increased for work as a whole, even if a state in which a recovery efficiency decline exists in a specific work process, the state can be avoided.

As the operation instruction for instructing the connection control, an instruction can be issued to the selection circuit by detecting with a controller a displacement amount of an operation lever for operating hydraulic actuators or a displacement amount of spools slid by the operation lever, or by using a pilot pressure or the like outputted by the operation lever.

DESCRIPTION OF THE PREFERRED EMBODIMENTS

Preferred embodiments of the present invention will be hereinafter described specifically based upon the accompanying drawings. The present invention can be effectively applied as a pressure oil energies selective recovery apparatus and a selective recovery method therefor which, in plural hydraulic actuators which are used, for example, in a construction machine such as a hydraulic excavator and a civil engineering machine such as a bulldozer or a wheel loader, can select a return pressure oil out of return pressure oils returned from the plural hydraulic actuators and recover the recovery pressure oil prioritizing operability of the hydraulic actuators or prioritizing a pressure oil with a high recovery efficiency out of plural pressure oils. Note that the plural pressure oil energies selective recovery apparatus and the selective recovery method in the present invention is not limited to the above-mentioned hydraulic actuator in the construction machine or the civil engineering machine but can be applied to an elevating apparatus or the like such as a crane or an elevator in which plural hydraulic actuators are used.

Figure 1:
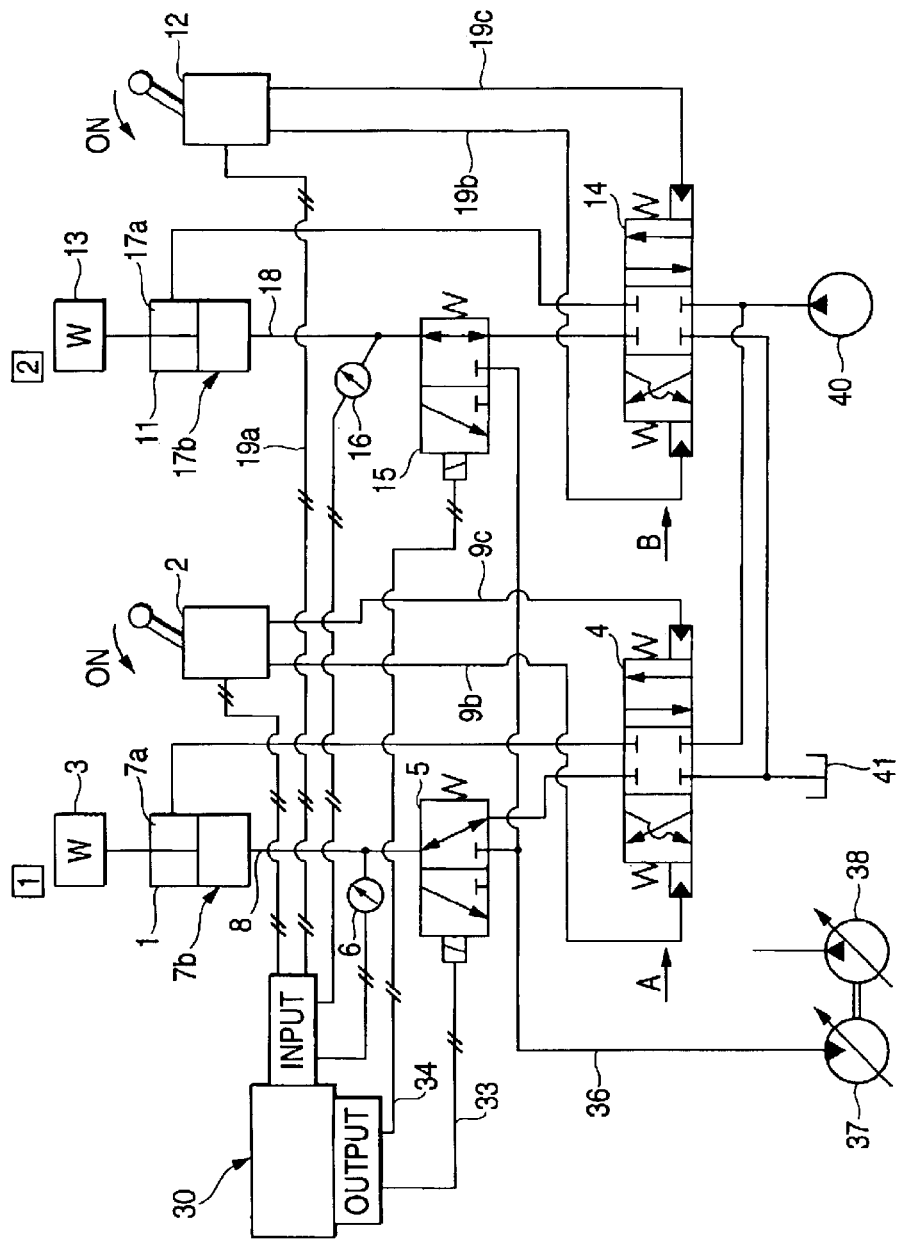
FIG. 1 is a schematic view of a hydraulic circuit.

FIG. 1 shows a schematic hydraulic circuit for explaining a plural pressure oil energies selective recovery apparatus and a selective recovery method therefor in the present invention. In this hydraulic circuit diagram, a pressure oil discharged from a hydraulic pump 40 is supplied to first cylinder chambers 7a and 17a or second cylinder chambers 7b and 17b of hydraulic actuators 1 and 11 via flow amount control/switch valves 4 and 14 to drive the hydraulic actuators 1 and 11. Return pressure oils flown out from the second cylinder chambers 7b and 17b of the hydraulic actuators 1 and 11 pass through sub-recovery circuits 8 and 18 to be supplied to a variable hydraulic motor 37 serving as a return pressure oil recovery unit from a main recovery circuit 36 via switching valves 5 and 15. Alternatively, the return pressure oils are returned to a tank 41 via the switching valves 5 and 15. A variable hydraulic pump 38 serving as a regenerating unit mechanically coupled with the variable hydraulic motor 37 discharges a regenerating energy to perform reutilization of a return pressure oil energy such as accumulation of pressure in a not-shown accumulator 58, merging to drive energies in other drive sources, a pressure oil from a main pump, and the like.

By actuating the hydraulic actuators 1 and 11, respective loads 1 and 13 (e.g., a boom, an arm, or the like of a hydraulic excavator) are actuated. In addition, a pilot pressure according to a tilting amount of operation levers 2 and 12 is introduced in the flow amount control/switch valves 4 and 14, and a switching operation of the flow amount control/switch valves 4 and 14 and a flow amount of discharged pressure oil from the hydraulic pump 40 to be supplied to the first cylinder chambers 7a and 17a or the second cylinder chamber 7b and 17b can be adjusted. In addition, operation amounts of the operation levers 2 and 12 are detected by a not-shown detection sensor and inputted in a controller 30.

When an input signal relating to the operation amounts of the operation levers 2 and 12 is inputted, the controller 30 outputs a switching control signal for the switching valves 5 and 15 based upon a priority set in advance in the controller 30. The switching valves 5 and 15 having received the switching control signal from the controller 30 performs switching of circuits based upon the switching control signal and performs selective connection control between the sub-recovery circuit 8 or 18 and the main recovery circuit 36.

Figure 6:
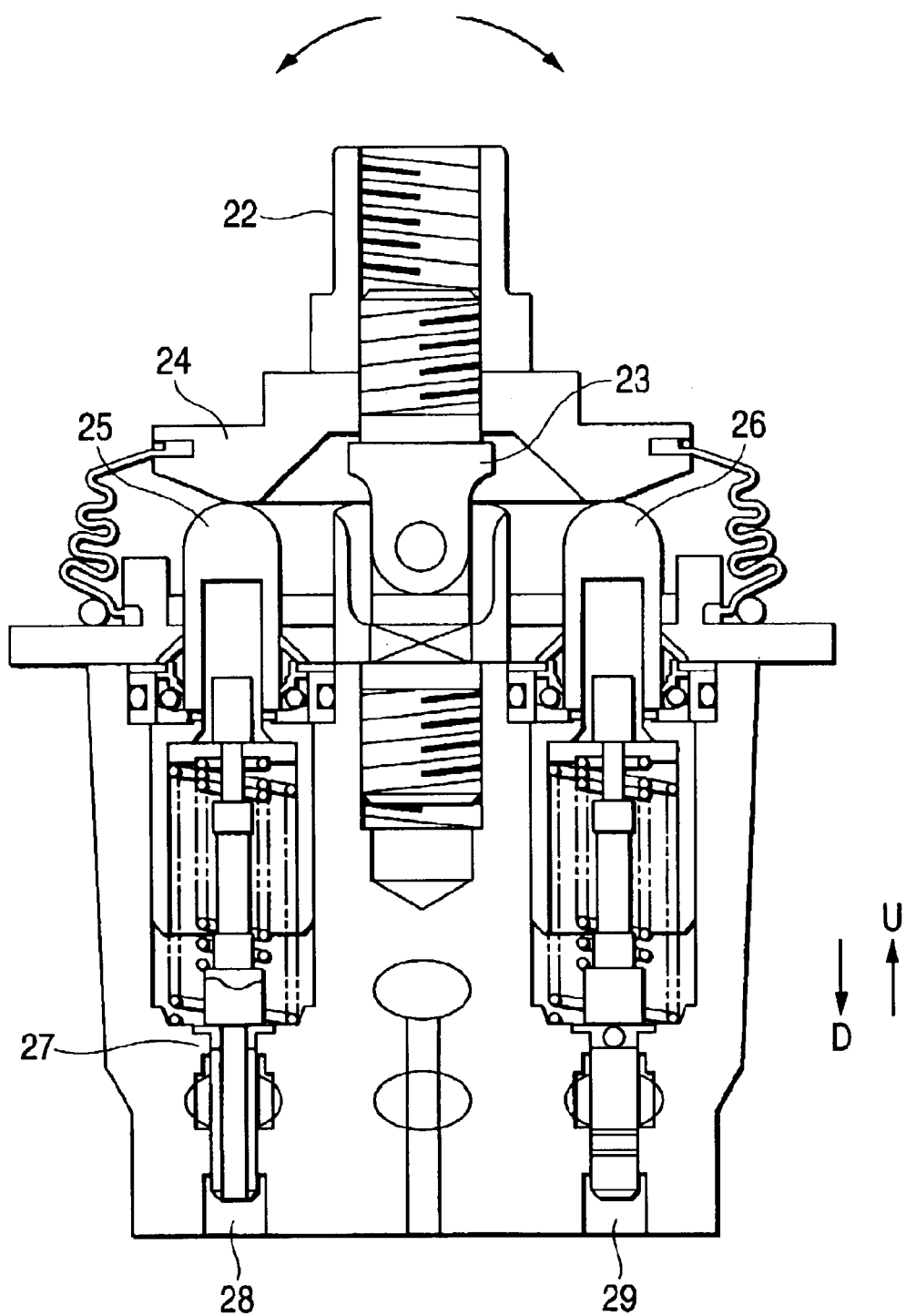
FIG. 6 is a schematic view of an operation lever.
Figure 7:
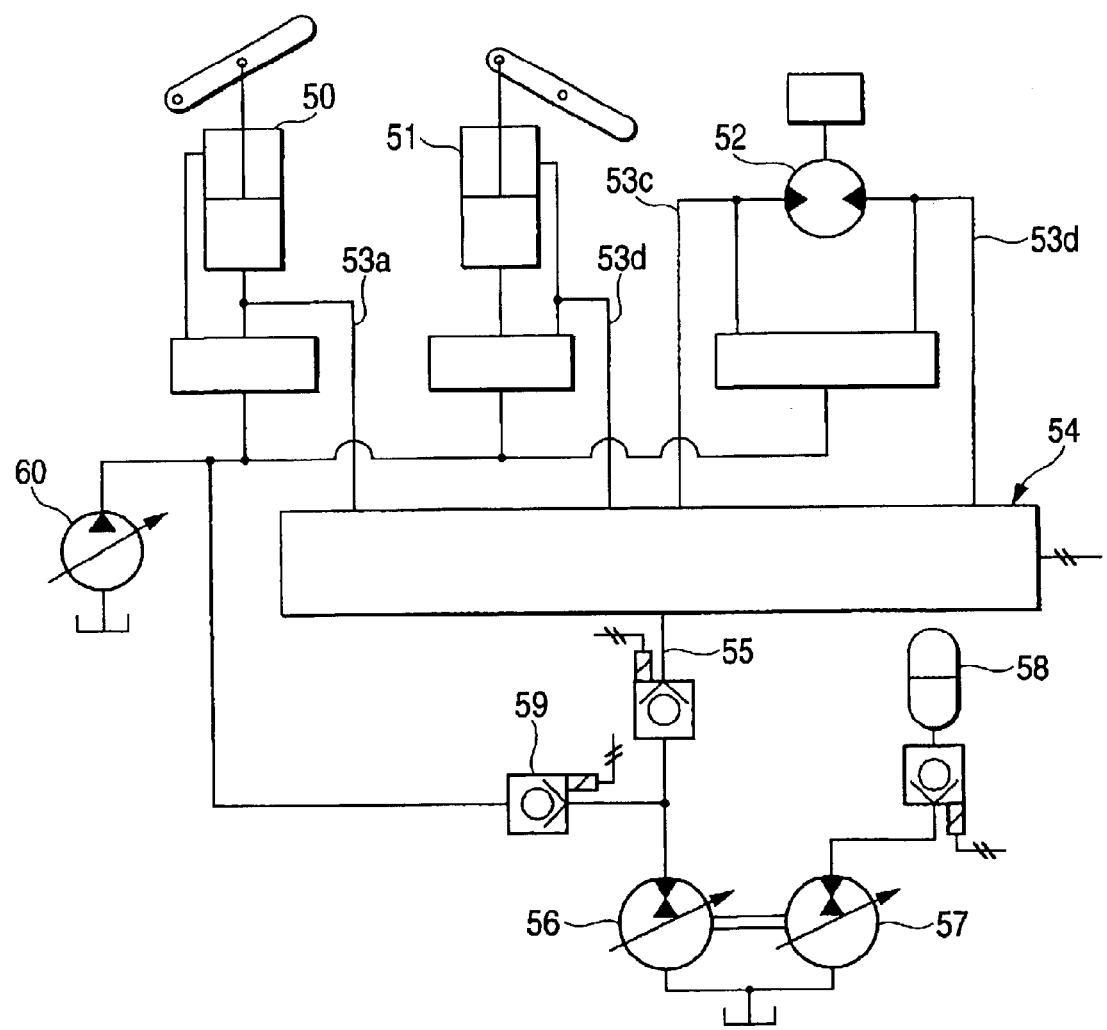
FIG. 7 is a hydraulic circuit diagram in a conventional example.

An operation lever will be described with reference to FIG. 6. Note that the operation lever to be described with reference to FIG. 6 is only an example, and an operation lever of the present invention is not limited to this operation lever and conventionally publicly known operation levers can be used. An operation lever 22 is attached to an apparatus main body via a universal joint 23 and a disk plate 24 so as to be freely tilt in front and rear directions and in a direction perpendicular to the paper surface of the figure. Upper ends of spools 25 and 26 abut against a lower surface of the disk plate 24, and tilting of the operation lever 22 pushes the corresponding spool 25 or 26 downward.

If the operation lever 22 in a neutral state is tilted in the counterclockwise direction in FIG. 6, the spool 25 is subjected to a thrust by the tilting of the operation lever 22 to be displaced in a direction of arrow D in the figure. When the spool 25 is displaced in the direction of arrow D, an opening area of a reducing valve 27 is restricted according to a displacement amount of the spool 25 to reduce a pressure of a pressure oil supplied from a not-shown hydraulic pump to output it to an output conduit line 28. A pilot pressure oil outputted from the reducing valve 27 passes pilot conduit lines 9b and 9c or 19b and 19c to be introduced into the flow amount control/switch valves 4 and 14 in FIG. 1.

An operation amount of the operation lever can be detected as a tilting angle of the operation lever to be detected by a not-shown sensor or a movement amount of the spools 25 and 26. Alternatively, pressures of the pilot conduit lines 9b and 9c or 19b and 19c may be detected.

Note that the state in which two sets of a combination of a hydraulic actuator, an operation lever, a switching valve, and a flow amount control/switch valve are provided is described in the above description of the hydraulic circuit. However, by providing plural sets of this combination, the same hydraulic circuit structure can be formed for the case in which plural hydraulic actuators are used. In addition, as the hydraulic actuator, a hydraulic motor can be used other than a cylinder type hydraulic actuator. In the case in which the hydraulic motor is used as the hydraulic actuator, it becomes necessary to provide a sub-recovery circuit connecting with a switching valve in each of two supply and discharge ports in the hydraulic motor, and the flow amount control/switch valve is required to be constituted so as to switch connection to the two ports.

In addition, although not illustrated, the plural pressure oil energies selective recovery apparatus may be constituted such that circuits for recovering return pressure oils flown out from the first cylinder chambers 7a and 17a of the hydraulic actuators 1 and 11 are provided and the recovery circuits are connected to the variable hydraulic motor 37, respectively, via the switching valves 5 and 15 and can recover energies of the return pressure oils from the first cylinder chambers 7a and 17a. Moreover, switching of return pressure oils and discharged pressure oils from the main hydraulic pump 40 can also be performed using check valves instead of the switching valves 5 and 15. Furthermore, a hydraulic pump motor can be used as a recovery unit whether it is a variable capacity type or a fixed capacity type. The hydraulic pump motor of the variable capacity type or the fixed capacity type can also be used, or a generator or the like can be used as a regenerating unit. These elements naturally include a technical scope which those skilled in the art can apply easily.

Figure 2:
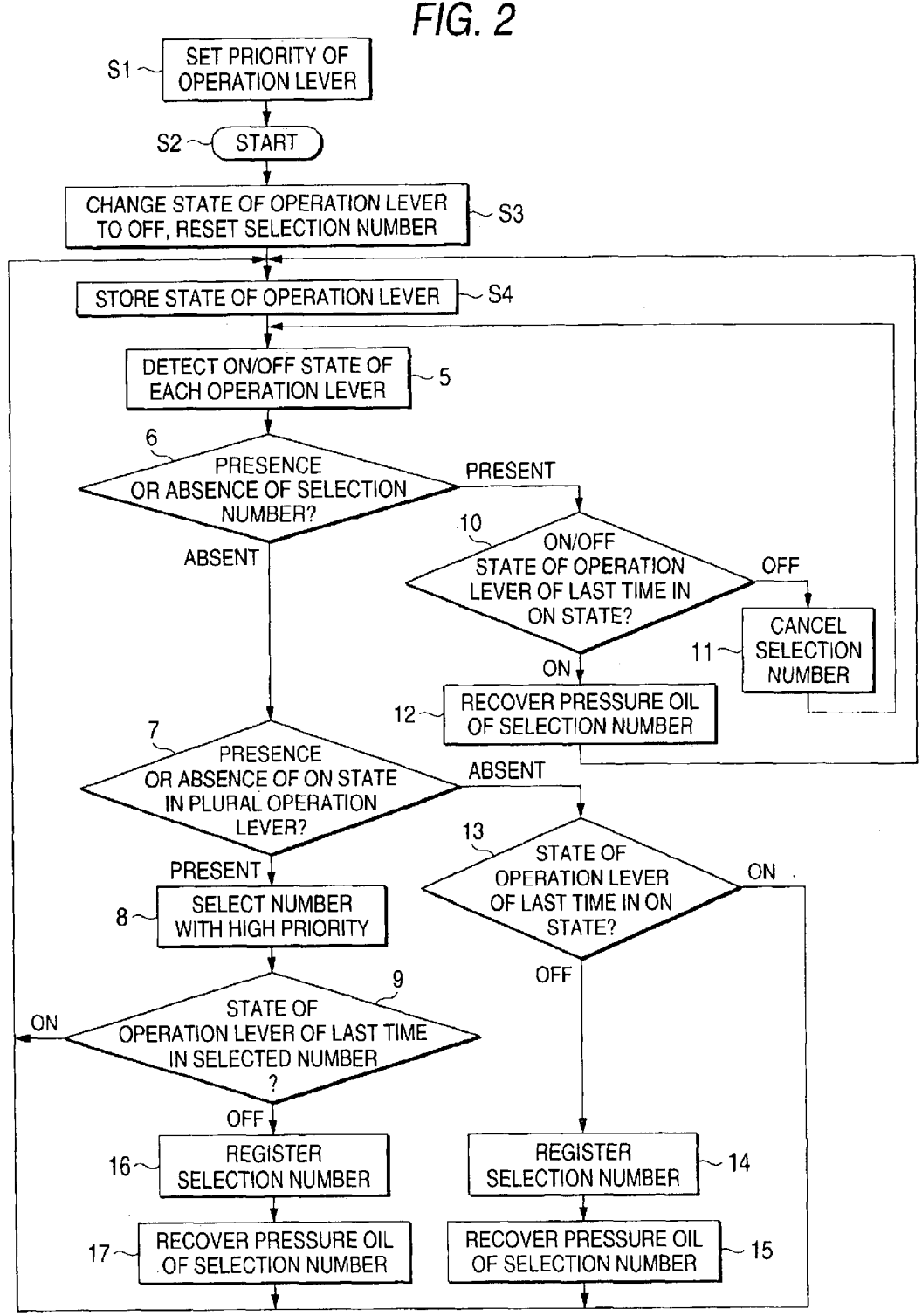
FIG. 2 is a flowchart of a first embodiment.

Next, a first embodiment of the present invention for preferentially recovering a return pressure oil from a hydraulic actuator operated earlier will be described with reference to FIGS. 2 and 3. In order to facilitate understanding of the description, the case in which the number of hydraulic actuators is two will be described as an example. However, it should be noted that the recovery of a return pressure oil can also be performed in the case in which the number of hydraulic actuators is two or more.

In step 1, the plural pressure oil energies selective recovery apparatus sets which of the hydraulic actuators 1 and 11 is prioritized in the controller 30 in advance. In the case in which there are plural hydraulic actuators, a priority of each hydraulic actuator is set in the controller 30 in advance. In this description, it is assumed that the hydraulic actuator 1 is prioritized.

In step 3, the plural pressure oil energies selective recovery apparatus performs setting of an initial state in the controller 30 according to a start signal in step 2. That is, the plural pressure oil energies selective recovery apparatus changes states of the respective operation levers 2 and 12 to the OFF state and resets a registration of a selection number specifying the hydraulic actuator operated earlier. As the selection number, a number previously given to each operation lever or hydraulic actuator is used. The ON state of the operation lever indicates a state in which the operation lever is being operated, and the OFF state indicates a state in which the operation lever is not being operated.

Note that the start signal is not always necessary and an appropriate method such as a method of regarding an input signal of an operation amount or the like from the operation levers 2 and 12 as the start signal can be adopted. In this description, it is assumed that the start signal is inputted.

In step 4, the plural pressure oil energies selective recovery apparatus stores the ON/OFF states of the respective operation levers 2 and 12, which are currently stored in the controller 30, in a memory or the like.

In step 5, the plural pressure oil energies selective recovery apparatus detects whether or not the respective operation levers 2 and 12 are operated according to the ON/OFF states of the respective operation levers 2 and 12.

In step 6, the plural pressure oil energies selective recovery apparatus judges whether or not the selection number of the hydraulic actuator operated earlier is registered. If the selection number is registered, the plural pressure oil energies selective recovery apparatus proceeds to step 10. If the selection number is not registered, the plural pressure oil energies selective recovery apparatus proceeds to step 7. At the current point, since the selection number is not registered, the plural pressure oil energies selective recovery apparatus proceeds to step 7.

In step 7, the plural pressure oil energies selective recovery apparatus proceeds to step 8 or step 13 depending upon the ON/OFF states of the respective operation levers 2 and 12 detected in step 5. Since both the operation levers 2 and 12 are in the ON state, the plural pressure oil energies selective recovery apparatus proceeds to step 8.

In step 8, the plural pressure oil energies selective recovery apparatus selects the operation lever 2 based upon the priority set in step 1.

In step 9, the plural pressure oil energies selective recovery apparatus calls the ON/OFF state of the operation lever 2 of last time, that is, the state of the operation lever 2 stored in step 4 to judge whether the state was ON or OFF. If the called state is ON, it means that the operation lever 2 was ON before the ON state of the operation lever 2 detected this time, and the plural pressure oil energies selective recovery apparatus judges that the ON state of the operation lever 2 detected this time is not a state in which the hydraulic actuator 1 started to move the operation lever 2, and the plural pressure oil energies selective recovery apparatus returns to step 4 without performing recovery of the return pressure oil from the hydraulic actuator 1. That is, in FIG. 3, for example, when the state of last time is d and the state of this time is e and both the states are the ON state, considering that the hydraulic actuator 1 is being actuated by the operation lever 2, the plural pressure oil energies selective recovery apparatus does not recover the return pressure oil from the hydraulic actuator 1 being actuated.

Figure 3:
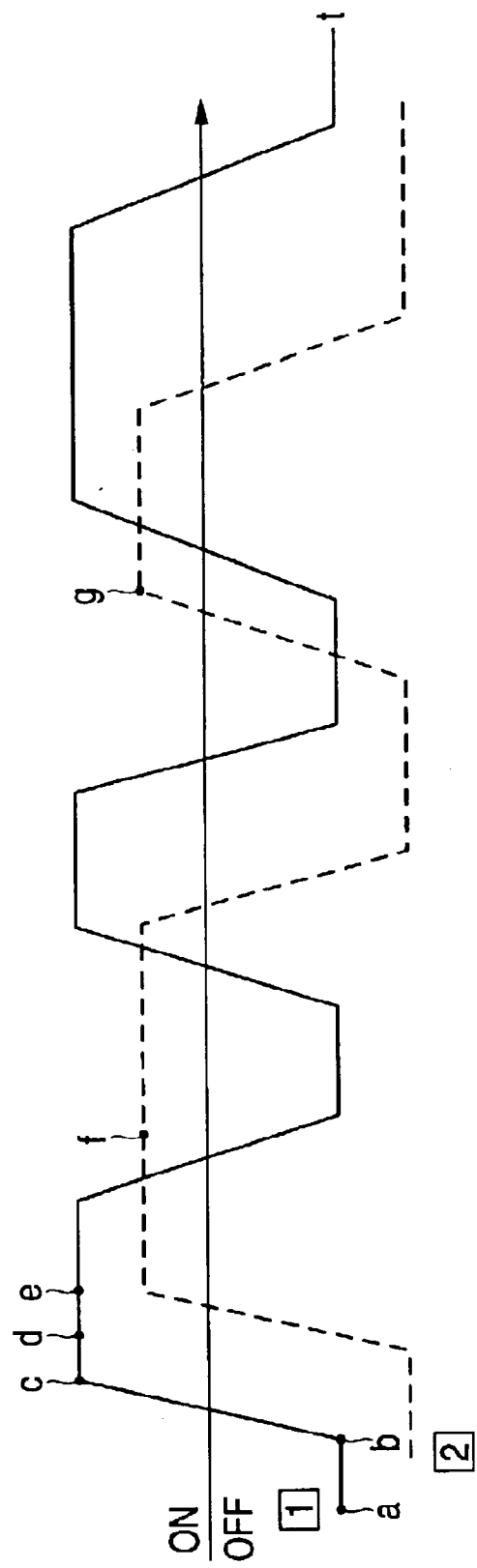
FIG. 3 shows an example of an ON/OFF state of an operation lever.

In addition, in step 9, if the state of last time of the operation lever 2 is OFF, for example, if the state of last time is b and the state of this time is c in FIG. 3, the plural pressure oil energies selective recovery apparatus judges that the state of the operation lever 2 detected this time is the state in which the hydraulic actuator 1 is started to move and proceeds to step 16.

In step 16, the plural pressure oil energies selective recovery apparatus registers a number corresponding to the operation lever 2 as a selection number in order to specify the hydraulic actuator 1 which is recovering the return pressure oil.

In step 17, the plural pressure oil energies selective recovery apparatus issues a switching control instruction to the switching valve 5 via a signal line 33 to connect the sub-recovery circuit 8 and the main recovery circuit 36 such that the return pressure oil from the hydraulic actuator 1 for which the selection number is registered can be recovered.

Next, the plural pressure oil energies selective recovery apparatus returns to step 4 and stores the states of the respective operation levers 2 and 12 as states of last time.

Next, the plural pressure oil energies selective recovery apparatus proceeds to step 5 to detect the ON/OFF state of the respective operation levers 2 and 12.

Then, the plural pressure oil energies selective recovery apparatus proceeds to step 6 to judge whether or not the selection number is registered. At the present time, since the selection number is registered, the plural pressure oil energies selective recovery apparatus proceeds to step 11.

In step 10, the plural pressure oil energies selective recovery apparatus judges a state of the operation lever 2 corresponding to the registered selection number detected in step 5. If the state of the operation lever 2 is ON, the plural pressure oil energies selective recovery apparatus proceeds to step 12 to continue recovery of the return pressure oil from the hydraulic actuator 1 and returns to step 4. The plural pressure oil energies selective recovery apparatus repeats this step until the state of the operation lever 2 changes to OFF. When the state of the operation lever 2 changes to OFF, the plural pressure oil energies selective recovery apparatus proceeds to step 11 to cancel the registration of the selection number and returns to step 5.

In step 5, the plural pressure oil energies selective recovery apparatus detects states of the respective operation levers 2 and 12 and proceeds to step 6.

In step 6, since the selection number is cancelled in step 11 and there is no registered selection number, the plural pressure oil energies selective recovery apparatus proceeds to step 7.

In step 7, when there are plural operation levers in which the state detected in step 5 is ON, the plural pressure oil energies selective recovery apparatus proceeds to step 8. When there are not plural operation levers in which the state is ON, the plural pressure oil energies selective recovery apparatus proceeds to step 13.

Now, if the plural pressure oil energies selective recovery apparatus proceeds to step 13, the plural pressure oil energies selective recovery apparatus calls the state of last time of the operation lever 12 detected as the ON state in step 5, that is, the state stored in step 4 and judges whether the state of last time was ON or OFF. When the state of last time was OFF, the plural pressure oil energies selective recovery apparatus judges that the operation lever 12 is in, for example, a state of g in FIG. 3, registers the number of the operation lever 12 as a selection number in step 14, and performs recovery of the return pressure oil from the hydraulic actuator 11 (hydraulic actuator operated by the operation lever 12) in step 15.

In step 13, when the state of last time of the operation lever 12 is ON, that is, the operation lever 12 is in a state of f last time in FIG. 3, since the hydraulic actuator 11 is being actuated, the plural pressure oil energies selective recovery apparatus returns to step 4 without performing recovery of the return pressure oil from the hydraulic actuator 11 and repeats the step of recovering the return pressure oil.

Consequently, the return pressure oil from the hydraulic actuator operated earlier can be recovered, and recovery of return pressure oils from the other hydraulic actuators can be prohibited until the recovery ends. Alternatively, recovery of a return pressure oil from a hydraulic actuator being actuated can also be prohibited.

Consequently, a switching shock due to switching during recovery, a speed change in a hydraulic pump motor or the like serving as a recovery unit, and a change in an actuation speed of a hydraulic actuator can be prevented. Moreover, this can be attained without providing a special circuit for preventing a switching shock and a speed change.

Figure 4:
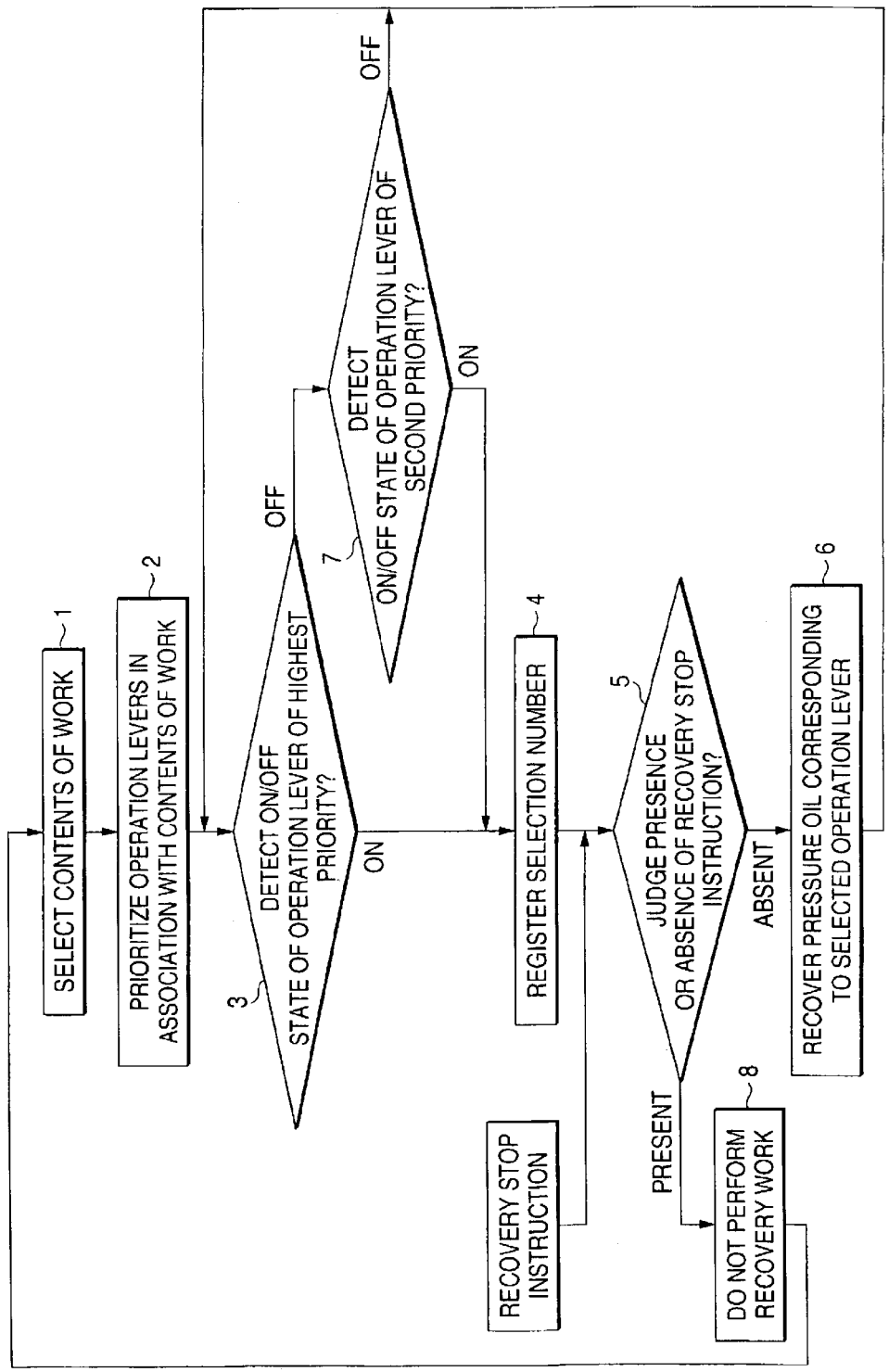
FIG. 4 is a flowchart of a second embodiment.

A second embodiment of the present invention which can change a priority of a hydraulic actuator, from which a return pressure oil is recovered, depending upon contents of work will be described with reference to FIG. 4.

In step 1, the plural pressure oil energies selective recovery apparatus selects contents of work.

In step 2, the plural pressure oil energies selective recovery apparatus prioritizes operation levers in association with the contents of work selected in step 1 based on the information in which priority to recover return pressure oil according to the content of each work was previously determined.

In step 3, the plural pressure oil energies selective recovery apparatus detects an ON/OFF state of an operation lever with a highest priority among the operation levers to which the priorities are given in step 2. Here, when it is assumed that the operation lever with the highest priority given in Step 2 is denoted by reference numeral 2, when the operation lever 2 is ON, the plural pressure oil energies selective recovery apparatus proceeds to step 4 to register the number of the operation lever 2 as a selection number. Moreover, in step 5, the plural pressure oil energies selective recovery apparatus judges whether or not recovery of a return pressure oil from the hydraulic actuator is stopped according to an operation instruction from the outside. When the recovery of the return pressure oil from the hydraulic actuator is stopped, the plural pressure oil energies selective recovery apparatus proceeds to step 8 without performing recovery work. When the recovery is not stopped, the plural pressure oil energies selective recovery apparatus proceeds to step 6 to issue a switching control instruction to the switching valve 5 in order to execute the recovery work of the return pressure oil from the selected hydraulic actuator land, at the same time, returns to step 3 to repeat the step for recovering the return pressure oil.

When the state of the operation lever 2 is OFF in step 3, the plural pressure oil energies selective recovery apparatus proceeds to step 7 to detect an ON/OFF state of the operation lever 12 with a second priority.

When the operation lever 12 is ON in step 7, the plural pressure oil energies selective recovery apparatus proceeds to step 4 to register the number of the operation lever 12 as a selection number. When the operation lever 12 is OFF in step 7, the plural pressure oil energies selective recovery apparatus returns to step 3.

Consequently, even if a priority with which a recovery efficiency becomes highest is determined in advance, the priority can be changed by issuing a recovery stop instruction or the like during recovery. Therefore, in the case in which a recovery efficiency decreases in a specific work process even if a recovery efficiency as a whole is set to be high, recovery at that point can be changed to recovery from another hydraulic actuator. In addition, when plural hydraulic actuators are actuated, if a priority is set to a return pressure oil in a merged state of return pressure oils from one or more hydraulic actuators, a return pressure oil in which a return pressure oil from a hydraulic actuator with a low recovery efficiency and a return pressure oil from another hydraulic actuator are merged can be recovered.

Figure 5:
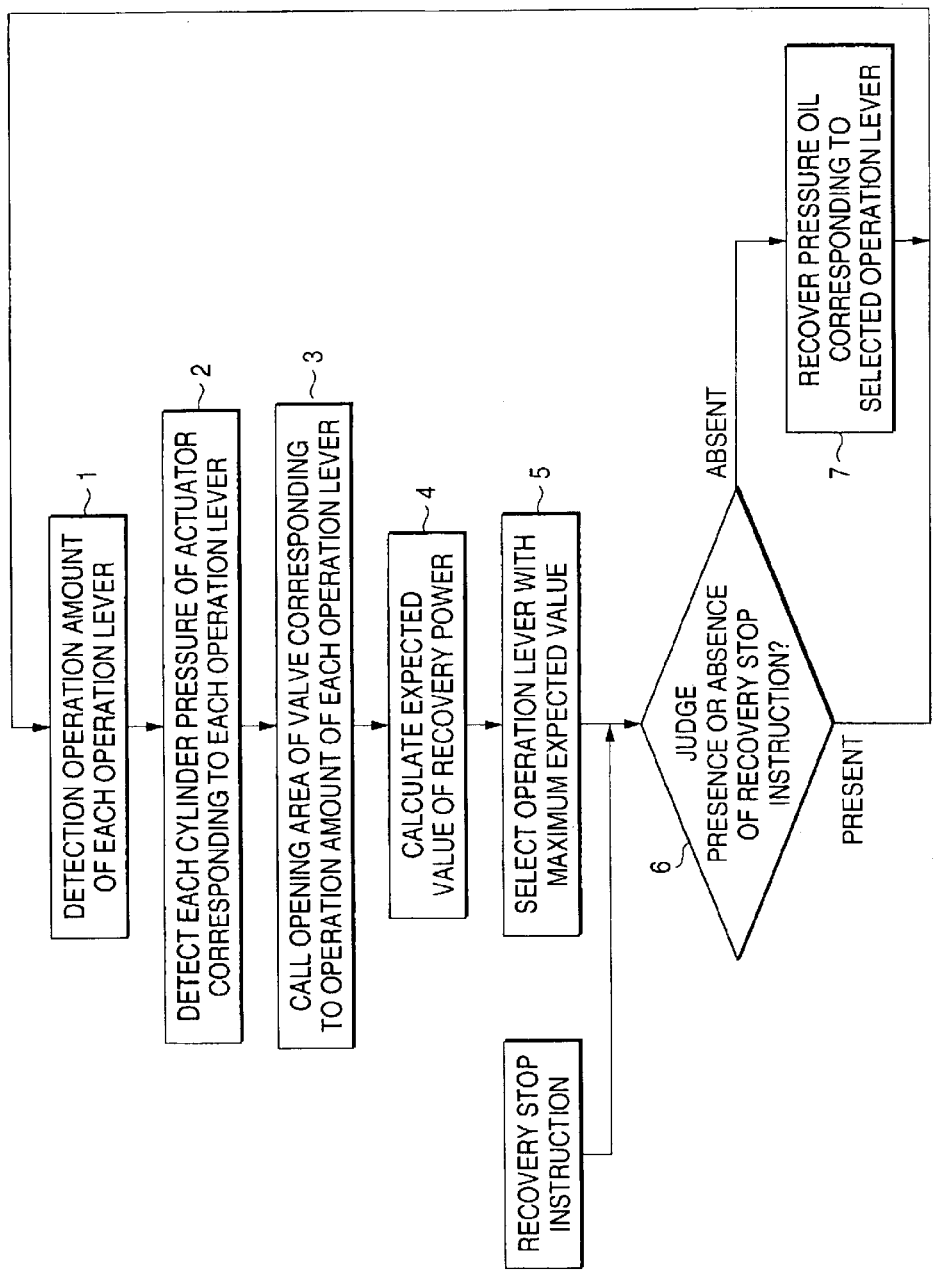
FIG. 5 is a flowchart of a third embodiment.

A third embodiment of the present invention which can recover a return pressure oil by selecting a hydraulic actuator with a high recovery efficiency will be described with reference to FIG. 5.

In step 1, the plural pressure oil energies selective recovery apparatus detects operation amounts of the respective operation levers 2 and 12 according to inclination angles of the operation levers or displacement of spools to be driven by the operation levers.

In step 2, the plural pressure oil energies selective recovery apparatus detects cylinder pressures of the hydraulic actuators 1 and 11 corresponding to the operation levers 2 and 12, respectively, with pressure gauges 6 and 16 (see FIG. 1) provided in the sub-recovery circuits 8 and 18.

In step 3, in the flow amount control/switch valve 4 to which a pilot pressure corresponding to the operation amounts of the operation levers 2 and 12 is supplied, the plural pressure oil energies selective recovery apparatus uses a relationship between an opening area in a communication section of the flow amount control/switch valve 4 moved by the pilot pressure and the operation amounts of the operation levers 2 and 12, which is prepared in advance, to find the opening area of the communication section from the operation amounts of the operation levers 2 and 12.

In step 4, the plural pressure oil energies selective recovery apparatus calculates expected values of powers of return pressure oils from respective hydraulic actuators according to expression, power $(Ps)=C \times A \times P^{2/3}$, from a pressure P in a cylinder in each hydraulic actuator and an opening area A found in steps 2 and 3. Note that C is a constant.

In step 5, the plural pressure oil energies selective recovery apparatus compares the expected values of the powers of the return pressure oils of the respective hydraulic actuators calculated in step 4 and arranges the hydraulic actuators in order from one with a highest expected value and determines priorities of corresponding operation levers in accordance with the order and, at the same time, determines an operation lever for which the expected value is maximum, that is, with a highest priority.

In step 6, the plural pressure oil energies selective recovery apparatus judges whether or not a recover stop instruction for the return pressure oil from the hydraulic actuator has been issued. When the recovery stop instruction has not been issued, the plural pressure oil energies selective recovery apparatus proceeds to step 7. When the recovery stop instruction is issued, the plural pressure oil energies selective recovery apparatus proceeds to step 1.

In step 7, the plural pressure oil energies selective recovery apparatus controls a switching valve to connect sub-recovery circuits and a main recovery circuit. The plural pressure oil energies selective recovery apparatus returns to step 1 from step 7 to repeat the step for recovering a return pressure oil.

Note that the expected value in step 5 can be set such that return pressure oils are recovered only from hydraulic actuators with a predetermined powers or more considering a recovery efficiency.

Consequently, return pressure oils from hydraulic actuators with a high recovery efficiency can be recovered preferentially.

What is claimed is:

1. A plural pressure oil energies selective recovery apparatus, comprising:

plural sub-recovery circuits in which return pressure oils from plural hydraulic actuators flow, respectively;

a main recovery circuit connected to return pressure oil recovery means; and selection means which controls the main recovery circuit and one or more of the sub-recovery circuit to be connected selectively, wherein the selection means is a selection circuit which controls the sub-recovery circuits and the main recovery circuit to be connected selectively based upon a plurality of conditions including conditions for prioritizing operability of the hydraulic actuators and conditions for prioritizing a return pressure oil with a high recovery efficiency out of the plural recovery pressure oils.

2. The plural pressure oil energies selective recovery apparatus according to claim 1, wherein the selection circuit is a selection circuit which controls the sub-recovery circuit connecting to a hydraulic actuator, which is selected according to contents of work and the main recovery circuit to be connected selectively.

3. The plural pressure oil energies selective recovery apparatus according to claim 1, wherein the selection circuit is a selection circuit which controls the sub-recovery circuit connecting to a hydraulic actuator with a high recovery efficiency and the main recovery circuit to be connected selectively.

4. A plural pressure oil energies selective recovery apparatus comprising:

plural sub-recovery circuits in which return pressure oils from plural hydraulic actuators flow, respectively;

a main recovery circuit connected to return pressure oil recovery means; and selection means which controls the main recovery circuit and or more of the sub-recovery to be connected selectively, wherein the selection means is a selection circuit which controls the sub-recovery circuit connecting to a hydraulic actuator operated earlier and the main recovery circuit to be connected selectively based upon conditions for prioritizing operability of the hydraulic actuators or condition for prioritizing a return pressure oil with a high recovery efficiency out of the plural recovery pressure oils.

5. A plural pressure oil energies selective recovery method for controlling plural sub-recovery circuits, in which return pressure oils from plural hydraulic actuators flow, respectively, and a main recovery circuit, which is connected to a return pressure oil recovery apparatus, to be connected selectively, wherein the connection control is controlled based upon a plurality of conditions including conditions for prioritizing operability of the hydraulic actuators and conditions for prioritizing a recovery efficiency of the recovery pressure oils.

* * * * *